US012612757B2

(12) United States Patent
Ninomiya et al.

(10) Patent No.: US 12,612,757 B2
(45) Date of Patent: Apr. 28, 2026

(54) HYDRAULIC SYSTEM FOR WORK MACHINE, WORK MACHINE, AND METHOD FOR CONTROLLING HYDRAULIC SYSTEM

(71) Applicant: KOMATSU LTD., Tokyo (JP)

(72) Inventors: Kiyotaka Ninomiya, Tokyo (JP); Koji Sato, Tokyo (JP); Takuya Higashiura, Tokyo (JP); Yuji Fukuda, Tokyo (JP); Akihiro Koyama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 710 days.

(21) Appl. No.: 17/911,495

(22) PCT Filed: Mar. 8, 2021

(86) PCT No.: PCT/JP2021/008855
§ 371 (c)(1),
(2) Date: Sep. 14, 2022

(87) PCT Pub. No.: WO2021/187181
PCT Pub. Date: Sep. 23, 2021

(65) Prior Publication Data

US 2023/0098551 A1 Mar. 30, 2023

(30) Foreign Application Priority Data

Mar. 16, 2020 (JP) ................................ 2020-044981

(51) Int. Cl.
*E02F 3/36* (2006.01)
*E02F 9/20* (2006.01)
(Continued)

(52) U.S. Cl.
CPC .......... *E02F 3/3663* (2013.01); *E02F 3/3631* (2013.01); *E02F 9/2004* (2013.01);
(Continued)

(58) Field of Classification Search
CPC ........ E02F 9/268; E02F 3/3622; E02F 3/3663
See application file for complete search history.

(56) References Cited

U.S. PATENT DOCUMENTS

| | | | | |
|---|---|---|---|---|
| 10,214,873 B2 * | 2/2019 | Meier | .................. | E02F 3/3663 |
| 2003/0115866 A1 * | 6/2003 | Price | .................... | F15B 21/087 60/431 |

(Continued)

FOREIGN PATENT DOCUMENTS

| | | | |
|---|---|---|---|
| CA | 2 787 871 A1 | | 2/2013 |
| CN | 101438064 A | | 5/2009 |

(Continued)

*Primary Examiner* — Abiy Teka
(74) *Attorney, Agent, or Firm* — Faegre Drinker Biddle & Reath LLP

(57) ABSTRACT

A coupler cylinder is driven between a locked state and an unlocked state of a bucket by being supplied with hydraulic oil. A main pump supplies the hydraulic oil to the coupler cylinder. A pressure increasing valve controls the supply of the hydraulic oil to the coupler cylinder. A controller controls drive of the pressure increasing valve. The controller instructs the pressure increasing valve to stop the supply of the hydraulic oil to the coupler cylinder based on pressure in an oil passage between the main pump and the coupler cylinder.

8 Claims, 8 Drawing Sheets

(51) Int. Cl.
*E02F 9/22* (2006.01)
*F15B 13/02* (2006.01)

(52) U.S. Cl.
CPC ............ *E02F 9/2228* (2013.01); *F15B 13/02* (2013.01); *F15B 2211/526* (2013.01)

(56) References Cited

U.S. PATENT DOCUMENTS

| | | | | |
|---|---|---|---|---|
| 2010/0000209 | A1 | 1/2010 | Wada et al. | |
| 2013/0160441 | A1 | 6/2013 | Yokohata et al. | |
| 2014/0331663 | A1 | 11/2014 | Robl et al. | |
| 2017/0030047 | A1* | 2/2017 | Yokota | E02F 3/32 |
| 2021/0071392 | A1 | 3/2021 | Moriki et al. | |

FOREIGN PATENT DOCUMENTS

| | | | | |
|---|---|---|---|---|
| CN | 105229239 | A | 1/2016 | |
| CN | 106133249 | A | 11/2016 | |
| JP | 2003-074296 | A | 3/2003 | |
| JP | 2009-150462 | A | 7/2009 | |
| JP | 2012-002034 | A | 1/2012 | |
| JP | 2019-120391 | A | 7/2019 | |
| JP | 2020-2734 | A | 1/2020 | |
| JP | 2020-2735 | A | 1/2020 | |
| WO | WO-2015102120 | A1 * | 7/2015 | E02F 3/3663 |

* cited by examiner

HYDRAULIC SYSTEM FOR WORK MACHINE, WORK MACHINE, AND METHOD FOR CONTROLLING HYDRAULIC SYSTEM

TECHNICAL FIELD

The present disclosure relates to a hydraulic system for a work machine, the work machine, and a method for controlling the hydraulic system.

BACKGROUND ART

Conventionally, there is known a work machine in which a quick coupler capable of attaching and detaching various attachments is provided at a distal end of a work implement. The quick coupler includes a quick coupler cylinder. The quick coupler cylinder locks or unlocks the attachment by expanding and contracting with supply of hydraulic oil.

At this point, Japanese Patent Laying-Open No. 2012-2034 (see PTL 1) discloses a technique for terminating the supply of the hydraulic oil to the quick coupler cylinder after a predetermined time elapses from a switch operation when an operator performs the switch operation to lock the attachment. According to this technique, fuel efficiency can be improved by efficiently driving a hydraulic pump.

CITATION LIST

Patent Literature

PTL 1: Japanese Patent Laying-Open No. 2012-2034

SUMMARY OF INVENTION

Technical Problem

However, in the technique described in PTL 1, the supply of the hydraulic oil is terminated by time management. For this reason, when an abnormality exists in a quick coupler switching circuit, there is a risk that it is erroneously recognized that the attachment is locked because a predetermined time elapses even though the attachment is not locked. In this case, dropout of the attachment or the like is generated.

An object of the present disclosure is to provide a hydraulic system for a work machine, the work machine, and a method for controlling the hydraulic system, which have good fuel efficiency and can prevent erroneous recognition of a locked state.

Solution to Problem

A hydraulic system for a work machine of the present disclosure includes a coupler cylinder, a hydraulic pump, a valve, and a controller. The coupler cylinder is driven between an extended position and a retracted position by being supplied with oil. The hydraulic pump supplies the oil to the coupler cylinder in order to drive the coupler cylinder between the extended position and the retracted position. The valve controls the supply of the oil to the coupler cylinder. The controller controls drive of the valve. The controller instructs the valve to stop the supply of the oil to the coupler cylinder based on pressure in an oil passage between the hydraulic pump and the coupler cylinder.

A work machine of the present disclosure includes a machine body, an attachment, a coupler cylinder, a hydraulic pump, a valve, and a controller. The attachment can be switched between a locked state and an unlocked state with respect to the machine body. The coupler cylinder is driven between the locked state and the unlocked state of the attachment by being supplied with oil. The hydraulic pump supplies the oil to the coupler cylinder. The valve controls the supply of the oil to the coupler cylinder. The controller controls drive of the valve. The controller instructs the valve to stop the supply of the oil to the coupler cylinder based on pressure in an oil passage between the hydraulic pump and the coupler cylinder.

A method for controlling a hydraulic system of the present disclosure is a method for controlling a hydraulic system in a work machine including a coupler cylinder, a hydraulic pump, and a valve. The coupler cylinder is driven between an extended position and a retracted position by being supplied with oil. The hydraulic pump supplies the oil to the coupler cylinder in order to drive the coupler cylinder between the extended position and the retracted position. The valve controls the supply of the oil to the coupler cylinder. A method for controlling a hydraulic system includes the following steps.

Pressure in an oil passage between the hydraulic pump and the coupler cylinder is detected. A supply stop signal of the oil to the coupler cylinder to the valve is outputted based on the detected pressure.

Advantageous Effects of Invention

The hydraulic system for the work machine, the work machine, and the method for controlling the hydraulic system, which have good fuel efficiency and can suppress erroneous recognition of a locked state, can be implemented according to the present disclosure.

DESCRIPTION OF EMBODIMENT

Figure 1:
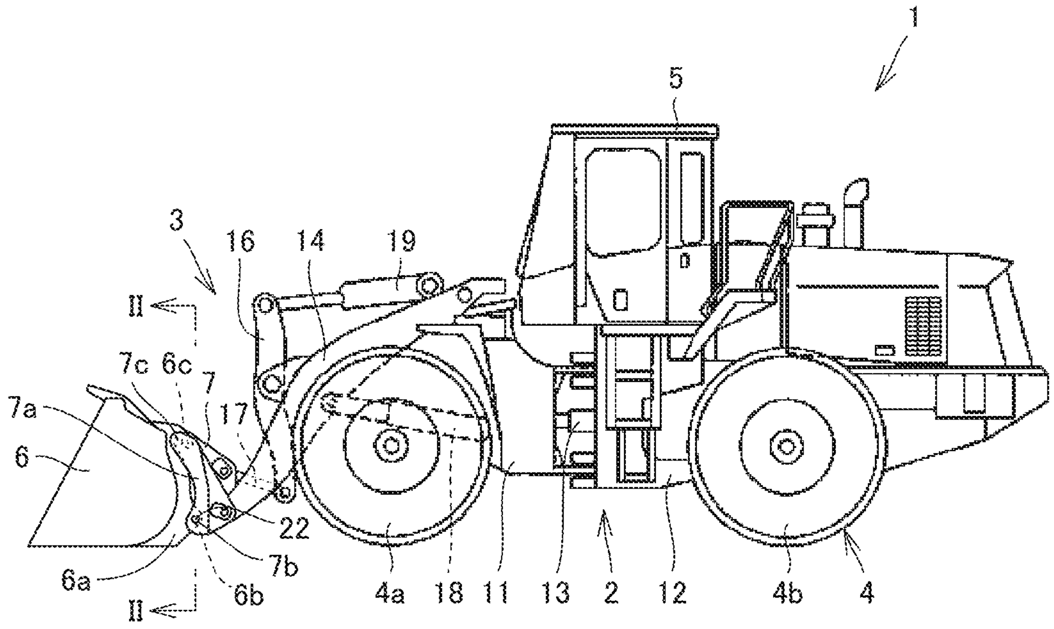
FIG. 1 is a side view illustrating a configuration of a wheel loader as an example of a work machine according to an embodiment of the present disclosure.

With reference to the drawings, an embodiment of the present disclosure will be described in detail below. In the specification and the drawings, the same components or corresponding components are denoted by the same reference numerals, and redundant description will not be repeated. In the drawings, the configuration may be omitted or simplified for convenience of description. In addition, at least a part of the embodiment and a modification may be arbitrarily combined with each other.

<Configuration of Wheel Loader 1>

With reference to FIG. 1, a configuration of a wheel loader as an example of a work machine according to an embodiment will be described. The work machine of the embodiment is not limited to the wheel loader. The work machine of the embodiment may be a work machine on which a quick coupler is mounted, and may be a hydraulic excavator, a bulldozer, a motor grader, or the like.

FIG. 1 is a side view illustrating a configuration of the work machine (wheel loader) according to the embodiment of the present disclosure. A wheel loader 1 includes a vehicle body frame 2, a work implement 3, a traveling device 4, and a cab 5.

Vehicle body frame 2 includes a front frame 11 and a rear frame 12. Front frame 11 is attached to work implement 3. An engine (not illustrated) or the like is mounted on rear frame 12.

A steering cylinder 13 is attached to front frame 11 and rear frame 12. Steering cylinder 13 is a hydraulic cylinder that expands and contracts by supply of hydraulic oil. Front frame 11 and rear frame 12 are swingable in a right-left direction by the extension and the contraction of steering cylinder 13.

Traveling device 4 includes a front traveling wheel 4*a* and a rear traveling wheel 4*b*. When each of front traveling wheel 4*a* and rear traveling wheel 4*b* is rotationally driven, wheel loader 1 self-travels. Cab 5 is placed on vehicle body frame 2. Cab 5 is disposed behind work implement 3. A seat on which an operator sits, an operating device, and the like are disposed in cab 5.

Work implement 3 is attached to a front of front frame 11. Work implement 3 includes a bucket 6, a quick coupler 7, a boom 14, a bell crank 16, a tilt rod 17, a boom cylinder 18, and a bucket cylinder 19.

Bucket 6 is one aspect of the attachment. The attachment is not limited to bucket 6, but may be another aspect such as a fork or a breaker.

A base end of boom 14 is rotatably attached to front frame 11. Bucket 6 is rotatably attached to the distal end of boom 14 with quick coupler 7 interposed therebetween.

Boom cylinder 18 drives boom 14. One end of boom cylinder 18 is rotatably attached to front frame 11. The other end of boom cylinder 18 is rotatably attached to boom 14.

Figure 3:
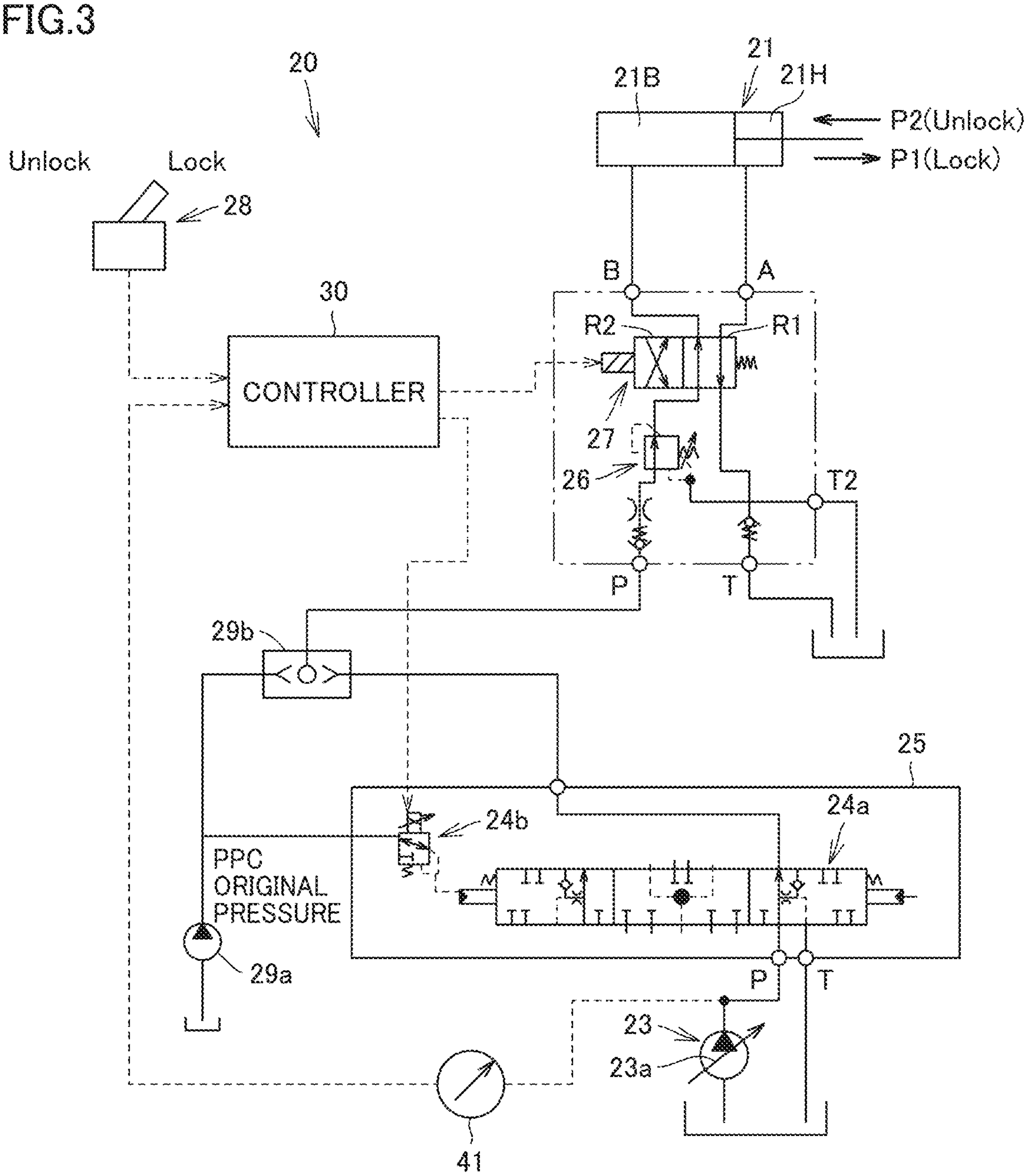
FIG. 3 is a view illustrating the locked state of the coupler cylinder in a hydraulic system used in the work machine of FIG. 1.
Figure 4:
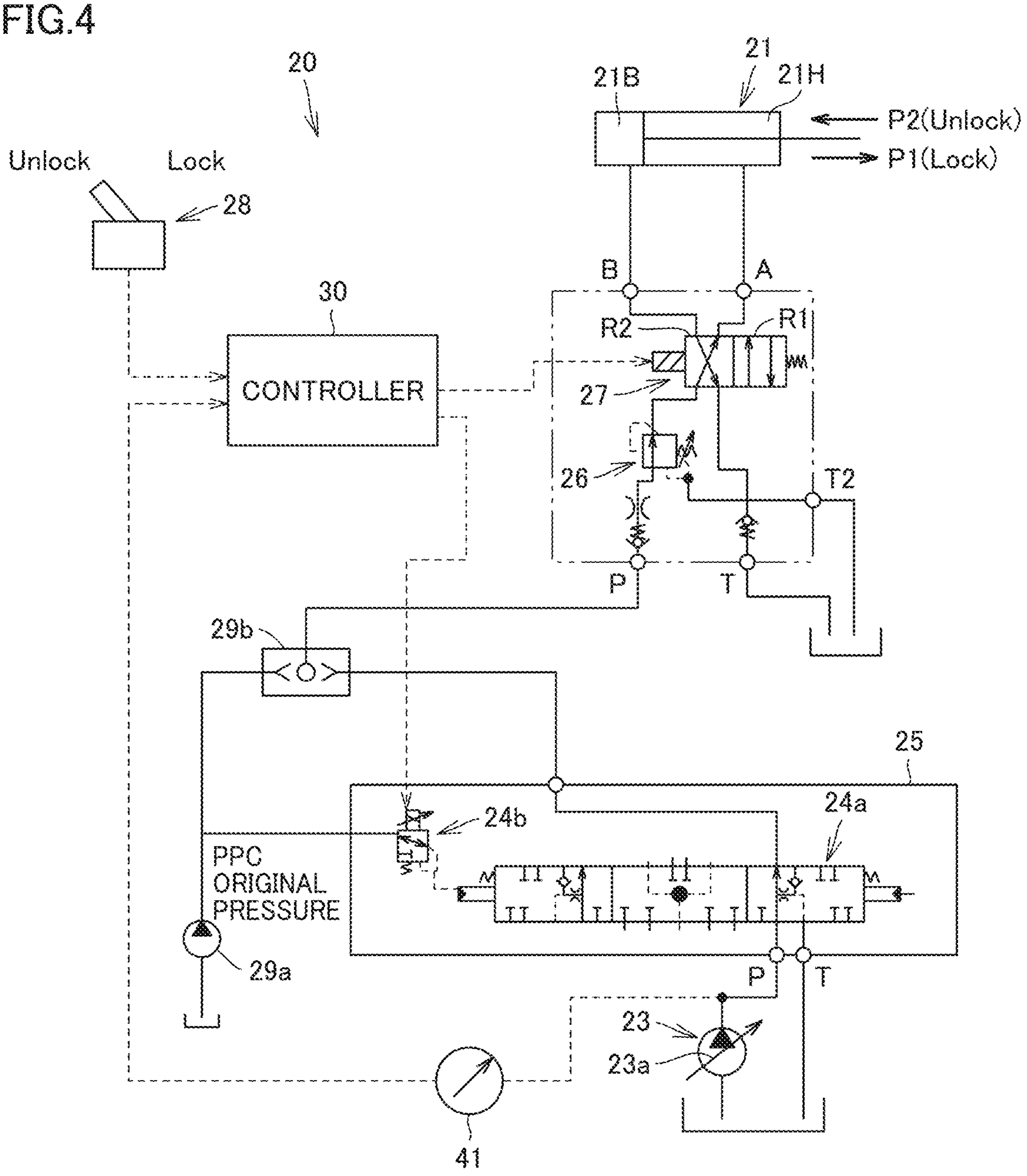
FIG. 4 is a view illustrating the unlocked state of the coupler cylinder in the hydraulic system used in the work machine of FIG. 1.

For example, boom cylinder 18 is a hydraulic cylinder. Boom cylinder 18 is expanded and contracted by the hydraulic oil from a main pump 23 (FIGS. 3 and 4). Thus, boom 14 is driven, and bucket 6 attached to the distal end of boom 14 moves up and down.

One end of bell crank 16 is connected to front frame 11 with bucket cylinder 19 interposed therebetween. The other end of bell crank 16 is connected to quick coupler 7 with tilt rod 17 interposed therebetween. Quick coupler 7 is rotatable with respect to boom 14 together with bucket 6.

One end of bucket cylinder 19 is rotatably attached to front frame 11. The other end of bucket cylinder 19 is rotatably attached to bell crank 16. For example, bucket cylinder 19 is a hydraulic cylinder. Bucket cylinder 19 is expanded and contracted by the hydraulic oil from main pump 23 (FIGS. 3 and 4). Thus, bucket 6 is driven, and bucket 6 rotates up and down with respect to boom 14.

Quick coupler 7 includes a frame 7*a* and a connecting pin 7*c*. Frame 7*a* includes a through-hole 7*b*. Through-hole 7*b* penetrates frame 7*a* in the right-left direction. Connecting pin 7*c* is fixed to frame 7*a* and extends in the right-left direction.

Quick coupler 7 includes a coupler cylinder (not illustrated). The coupler cylinder is a hydraulic cylinder that expands and contracts by supply of oil. A fixing pin 22 is attached to a distal end of a piston rod of the coupler cylinder.

Bucket 6 includes a bracket 6*a* at the rear end. Bracket 6*a* includes a through-hole 6*b*. Through-hole 6*b* penetrates bracket 6*a* in the right-left direction. A hook 6*c* is provided at an upper end of bracket 6*a*.

When bucket 6 is attached to quick coupler 7, first, hook 6*c* of bucket 6 is hooked on connecting pin 7*c* of quick coupler 7. Thereafter, fixing pin 22 attached to the coupler cylinder is inserted into both through-hole 6*b* of bucket 6 and through-hole 7*b* of quick coupler 7.

<Unlocked State and Locked State of Coupler Cylinder 21>

Figure 2:
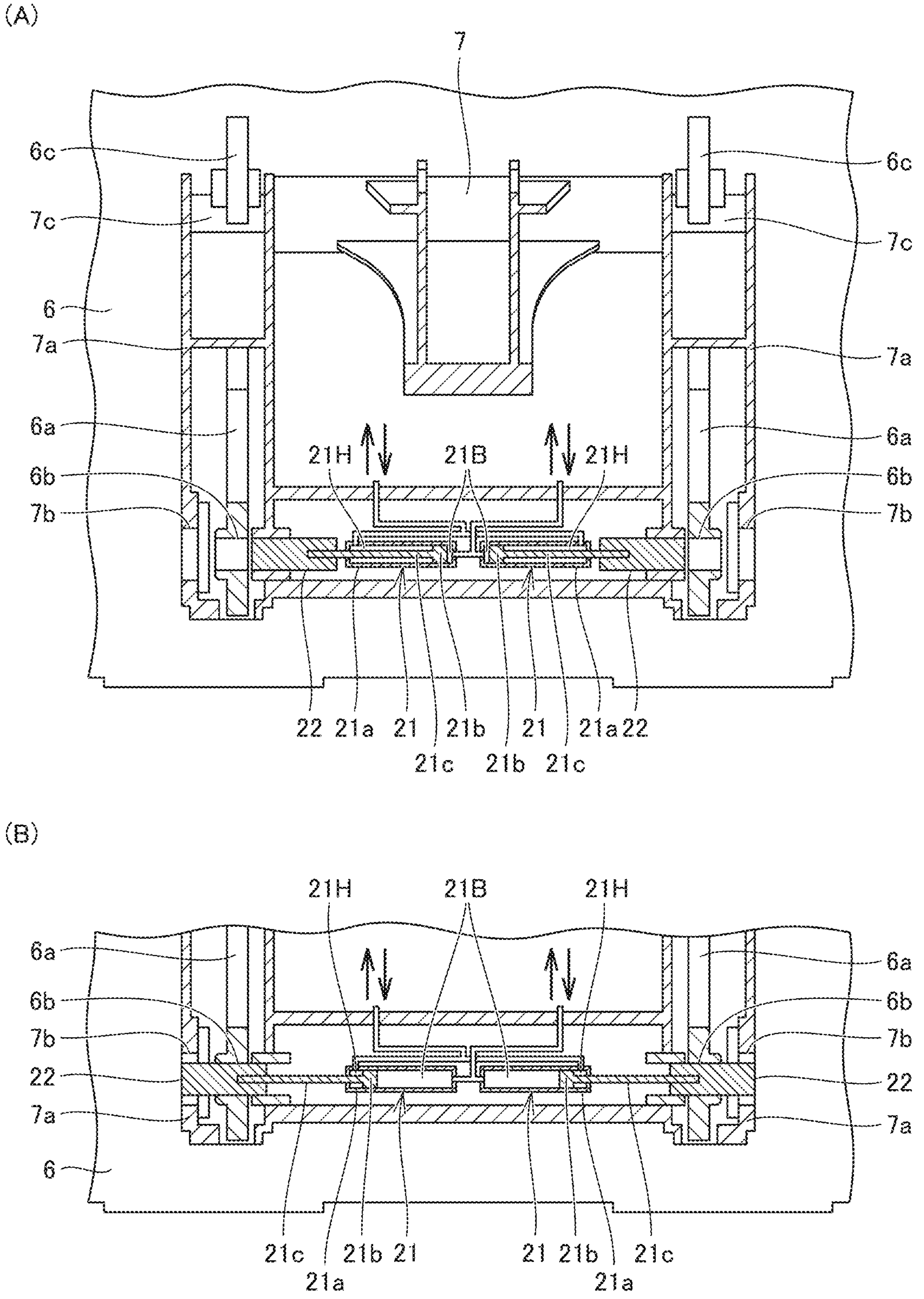
FIG. 2 is a sectional view taken along a line II-II in FIG. 1, and illustrates a state in which a coupler cylinder is driven between an unlocked state (A) and a locked state (B) in the work machine.

With reference to FIG. 2, an unlocked state and a locked state of a coupler cylinder 21 will be described below.

FIG. 2 is a sectional view taken along a line II-II in FIG. 1, and illustrates a state in which a coupler cylinder is driven between an unlocked state (A) and a locked state (B) in the work machine.

As illustrated in FIG. 2(A), quick coupler 7 includes coupler cylinder 21. Coupler cylinder 21 includes a cylinder tube 21*a*, a piston 21*b*, and a piston rod 21*c*.

Cylinder tube 21*a* has a cylindrical shape. Piston 21*b* is slidably disposed inside cylinder tube 21*a*. Piston rod 21*c* is connected to piston 21*b* at one end, and protrudes to an outside of cylinder tube 21*a* at the other end. Fixing pin 22 is connected to the other end of piston rod 21*c* protruding to the outside of cylinder tube 21*a*.

Oil can be supplied to and discharged from a head side 21H and a bottom side 21B of piston 21*b* inside cylinder tube 21*a*. Head side 21H of piston 21*b* means a side of piston rod 21*c* with respect to piston 21*b*. Bottom side 21B of piston 21*b* means a side opposite to head side 21H with respect to piston 21*b*.

Through-hole 7*b* made in frame 7*a* of quick coupler 7 is located on an extension line in an extending and contracting direction of coupler cylinder 21. Through-hole 7*b* has a size into which fixing pin 22 can be inserted. Through-hole 6*b* provided in bracket 6*a* of bucket 6 also has a size into which fixing pin 22 can be inserted.

When bucket 6 is attached to quick coupler 7, first, hook 6*c* of bucket 6 is hooked on connecting pin 7*c* of quick coupler 7. Thereafter, through-hole 6*b* of bucket 6 is located on the extension line of the extending and contracting direction of coupler cylinder 21. In this state, bucket 6 is not yet locked to quick coupler 7, but is in the unlocked state.

From this unlocked state, the hydraulic oil is supplied to bottom side 21B of coupler cylinder 21. Thus, piston 21*b* moves to head side 21H. Fixing pin 22 also moves along with the movement of piston 21*b*.

As illustrated in FIG. 2(B), fixing pin 22 is inserted into both through-hole 6*b* and through-hole 7*b* by the movement of fixing pin 22. Thus, bucket 6 is locked to quick coupler 7 and becomes the locked state.

In the embodiment, the locked state refers to a state in which coupler cylinder 21 is fixed at the extended position and the cylinder pressure (pressure on bottom side 21B) is a pressure greater than or equal to a predetermined value (for example, pressure greater than or equal to pilot pressure). Furthermore, in the embodiment, the unlocked state refers to a state in which coupler cylinder 21 is retracted, and refers to a state in which cylinder pressure (pressure on head side 21H) is a pressure greater than or equal to a predetermined value (for example, pressure greater than or equal to the pilot pressure). The pilot pressure will be described later.

The state in which coupler cylinder 21 is fixed at the retracted position and the cylinder pressure (the pressure on head side 21H) is a pressure greater than or equal to a predetermined value (for example, the pressure greater than or equal to the pilot pressure) may be set to the locked state. In addition, the state in which coupler cylinder 21 is fixed at the extended position and the cylinder pressure (the pressure on bottom side 21B) is a pressure greater than or equal to a predetermined value (for example, the pressure greater than or equal to the pilot pressure) may be set to the unlocked state.

When bucket 6 is transferred from the locked state to the unlocked state, the hydraulic oil is supplied to head side 21H of coupler cylinder 21. Thus, piston 21*b* moves to bottom side 21B. Fixing pin 22 also moves along with the movement of piston 21*b*.

As illustrated in FIG. 2(A), fixing pin 22 is pulled out from both through-hole 6*b* and through-hole 7*b* by the movement of fixing pin 22. Thus, the locked state of bucket 6 with respect to quick coupler 7 is released, and bucket 6 becomes the unlocked state.

<Hydraulic System 20>

With reference to FIGS. 3 and 4, hydraulic system 20 that drives and controls coupler cylinder 21 will be described below.

FIGS. 3 and 4 are views illustrating the locked state and the unlocked state of the coupler cylinder in the hydraulic system used in the work machine in FIG. 1.

As illustrated in FIG. 3, hydraulic system 20 includes a coupler cylinder 21, a main pump 23, a pressure increasing valve 25, a pressure reducing valve 26, a coupler switching valve 27, a changeover switch 28, a pump 29*a*, a shuttle valve 29*b*, a controller 30, and a pressure sensor 41.

Coupler cylinder 21 is driven in either a lock direction P1 or an unlock direction P2. Lock direction P1 is a drive direction locking bucket 6 to quick coupler 7. Unlock direction P2 is a drive direction unlocking bucket 6 from quick coupler 7.

In the embodiment, bucket 6 is locked when coupler cylinder 21 expands, and bucket 6 is unlocked when coupler cylinder 21 contracts. However, bucket 6 may be locked when coupler cylinder 21 contracts, and bucket 6 may be unlocked when coupler cylinder 21 expands.

Each of main pump 23 and pump 29*a* is driven by an engine (not illustrated). Main pump 23 supplies the hydraulic oil to each of coupler cylinder 21 and a work-implement cylinder (boom cylinder 18, bucket cylinder 19 in FIG. 1). Coupler cylinder 21 and work-implement cylinders 18, 19 are connected in parallel to main pump 23.

For example, main pump 23 is a variable discharge pressure oil pump. A capacity of the hydraulic oil supplied from main pump 23 can be adjusted by changing an inclination angle of swash plate 23*a*. The inclination angle of swash plate 23*a* is changed by a capacity control valve (not illustrated).

Pump 29*a* supplies pilot oil to each of coupler cylinder 21 and main valve 24*a*.

In the present specification, the oil supplied to cylinders 21, 18, 19 in order to operate coupler cylinder 21 and work-implement cylinders 18, 19 is referred to as the hydraulic oil. The oil supplied to hold the locked state or the unlocked state of coupler cylinder 21 or to drive the spool of main valve 24*a* is referred to as the pilot oil. The pressure of the pilot oil is referred to as pilot pressure (PPC pressure). For example, the hydraulic oil is oil having pressure of 30 MPa, and the pilot oil is oil having pressure (pilot oil pressure) of 3 MPa. The pressure of the hydraulic oil is different from the pilot oil pressure and is higher than the pilot oil pressure.

Pressure increasing valve 25 increases (pressure-increases) or decreases (pressure-reduces) the pressure of the hydraulic oil supplied to coupler cylinder 21. Pressure increasing valve 25 includes main valve 24*a* and an electromagnetic switching valve (solenoid valve) 24*b*.

Main valve 24*a* is connected to main pump 23 through hydraulic piping. Main valve 24*a* sends the hydraulic oil supplied from main pump 23 to coupler cylinder 21.

The pilot oil is supplied from pump 29*a* to electromagnetic switching valve 24*b*. Electromagnetic switching valve 24*b* is electrically connected to controller 30. Thus, electromagnetic switching valve 24*b* receives a current instruction from controller 30.

Electromagnetic switching valve 24*b* generates pilot pressure according to the current value of the current instruction. Electromagnetic switching valve 24*b* drives the spool of main valve 24*a* by the pilot pressure. An amount of hydraulic oil sent from main valve 24*a* to coupler cylinder 21 changes when the spool of main valve 24*a* is driven.

Thus, a supply start and a supply stop of the hydraulic oil to coupler cylinder 21 can be controlled. In addition, the increase (pressure increase) and the decrease (pressure reduction) of the hydraulic pressure of the hydraulic oil supplied to coupler cylinder 21 can be controlled.

Pressure reducing valve 26 is connected to main valve 24*a* and coupler switching valve 27 through hydraulic piping. When the hydraulic pressure of the hydraulic oil supplied from main pump 23 is greater than a predetermined value, pressure reducing valve 26 reduces the hydraulic pressure to a predetermined value. Thus, application of the excessive hydraulic pressure to coupler cylinder 21 is prevented. Pressure reducing valve 26 does not adjust the hydraulic pressure when the hydraulic pressure of the hydraulic oil supplied from main pump 23 is less than or equal to a predetermined value.

Coupler switching valve 27 is connected to pressure reducing valve 26 and coupler cylinder 21 through hydraulic piping. Coupler switching valve 27 is electrically connected to controller 30. Coupler switching valve 27 can switch between a lock-side position R1 and an unlock-side position R2 in response to an electric instruction from controller 30.

Lock-side position R1 is a position where the hydraulic oil from main pump 23 is supplied to coupler cylinder 21 such that coupler cylinder 21 is driven in lock direction P1. Specifically, when coupler switching valve 27 is at lock-side position R1, the hydraulic oil from main pump 23 is supplied to bottom side 21B of coupler cylinder 21.

Unlock-side position R2 is a position where the hydraulic oil from main pump 23 is supplied to coupler cylinder 21 such that coupler cylinder 21 is driven in unlock direction P2. Specifically, when coupler switching valve 27 is at unlock-side position R2, the hydraulic oil from main pump 23 is supplied to head side 21H of coupler cylinder 21.

The position of coupler switching valve 27 is switched by changeover switch 28. Changeover switch 28 is electrically connected to controller 30. Changeover switch 28 includes a lever, a dial, and the like that can be switched between at least two positions of a lock position and an unlock position. For example, changeover switch 28 is a seesaw switch, but is not limited thereto.

Controller 30 receives an electric signal representing either the locked position or the unlocked position of changeover switch 28 from changeover switch 28. Controller 30 issues the electric instruction for switching between lock-side position R1 and unlock-side position R2 to coupler switching valve 27 based on the electric signal indicating the position.

Shuttle valve 29*b* has two inlets and a common outlet, and the outlet is automatically connected to either one of the inlets by action of inlet pressure. Thus, shuttle valve 29*b* selectively supplies only one of the hydraulic oil supplied from main pump 23 and the pilot oil supplied from pump 29*a* to coupler cylinder 21.

Specifically, when the pressure of the hydraulic oil acting on shuttle valve 29*b* is greater than the pressure of the pilot oil acting on shuttle valve 29*b*, the hydraulic oil is supplied to coupler cylinder 21. When the pressure of the hydraulic oil acting on shuttle valve 29*b* is less than the pressure of the pilot oil acting on shuttle valve 29*b*, the pilot oil is supplied to coupler cylinder 21.

Pressure sensor 41 is provided in an oil passage between main pump 23 and coupler cylinder 21. Thus, the hydraulic pressure (pressure) in the oil passage between main pump 23 and coupler cylinder 21 is detected by pressure sensor 41. For example, pressure sensor 41 is provided in the oil passage between main pump 23 and main valve 24*a*.

Pressure sensor 41 is electrically connected to controller 30. Thus, the pressure detected by pressure sensor 41 is input to controller 30 as the electric signal. Controller 30 instructs electromagnetic switching valve 24*b* of pressure increasing valve 25 to stop the supply of the oil (for example, the hydraulic oil) to coupler cylinder 21 based on the electric signal indicating pressure.

When bucket 6 is in the locked state in hydraulic system 20, coupler switching valve 27 is switched to lock-side position R1 in response to the electric instruction from controller 30 as illustrated in FIG. 3. Thus, the hydraulic oil or the pilot oil is supplied to bottom side 21B of coupler cylinder 21.

On the other hand, when bucket 6 is in the unlocked state in hydraulic system 20, coupler switching valve 27 is switched to unlock-side position R2 in response to the electric instruction from controller 30 as illustrated in FIG. 4. Thus, the hydraulic oil or the pilot oil is supplied to head side 21H of coupler cylinder 21.

The hydraulic system in the embodiment is an alternate system. The alternate system is a system that increases the pressure of coupler cylinder 21 by inputting a signal of changeover switch 28 to pressure increasing valve 25 through controller 30.

In the case of the alternate system, when once changeover switch 28 is switched to the lock position or the unlock position, changeover switch 28 maintains the state even when the operator releases a hand from changeover switch 28. Changeover switch 28 that maintains the state even when the operator releases the hand in this manner is referred to as an "alternate switch" in the present specification.

When the pressure of coupler cylinder 21 is increased based on the operation of alternate switch 28, the pressure-increased hydraulic oil is continuously supplied to coupler cylinder 21. In this case, when the pressure increase of the hydraulic oil is not stopped, the hydraulic pressure continues to be relieved in the state where coupler cylinder 21 is at a stroke end, and the fuel continues to be wastefully consumed.

Accordingly, in the embodiment, whether coupler cylinder 21 reaches the stroke end is monitored by pressure sensor 41 and controller 30. Specifically, controller 30 considers that coupler cylinder 21 reaches the stroke end when the pressure detected by pressure sensor 41 becomes higher than a predetermined pressure, and instructs pressure increasing valve 25 to stop the supply of the oil (for example, hydraulic oil) to coupler cylinder 21.

<Functional Block of Controller 30>

Figure 5:
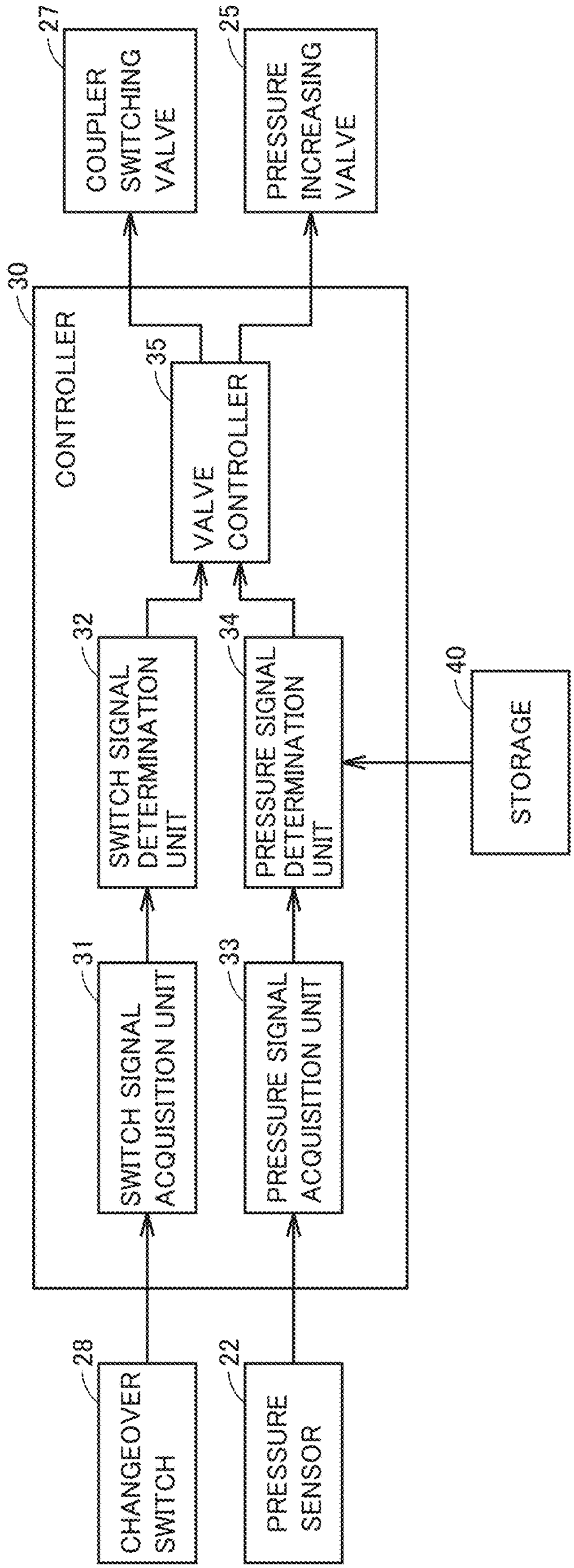
FIG. 5 is a view illustrating a functional block of a controller used in the work machine of FIG. 1.

With reference to FIG. 5, a functional block of controller 30 will be described below.

FIG. 5 is a view illustrating a functional block of the controller used in the work machine of FIG. 1. As illustrated in FIG. 5, controller 30 includes a switch signal acquisition unit 31, a switch signal determination unit 32, a pressure signal acquisition unit 33, a pressure signal determination unit 34, and a valve controller 35.

Switch signal acquisition unit 31 acquires an electric signal indicating either the lock position or the unlock position of changeover switch 28. Switch signal determination unit 32 determines whether changeover switch 28 is at the lock position or the unlock position based on the signal acquired by switch signal acquisition unit 31. Switch signal determination unit 32 outputs a position signal of the lock position or the unlock position to valve controller 35.

Valve controller 35 drives and controls coupler switching valve 27 based on the received position signal. When valve controller 35 receives the signal of the lock position, valve controller 35 controls coupler switching valve 27 such that coupler switching valve 27 is switched to lock-side position R1. When valve controller 35 receives the signal of the lock position, valve controller 35 instructs pressure increasing valve 25 to start the supply of the hydraulic oil to coupler cylinder 21. By this instruction, the hydraulic oil is supplied to bottom side 21B of coupler cylinder 21. Thus, coupler cylinder 21 is driven in lock direction P1 and enters the locked state.

When valve controller 35 receives the signal of the unlock position, valve controller 35 controls coupler switching valve 27 such that coupler switching valve 27 is switched to unlock-side position R2. When valve controller 35 receives the signal of the unlock position, valve controller 35 instructs pressure increasing valve 25 to start the supply of the hydraulic oil to coupler cylinder 21. By this instruction, the hydraulic oil is supplied to head side 21H of coupler cylinder 21. Thus, coupler cylinder 21 is driven in unlock direction P2, and coupler cylinder 21 becomes the unlocked state.

Pressure signal acquisition unit 33 acquires the electric signal indicating the pressure detected by pressure sensor 41. Pressure signal determination unit 34 determines the pressure value based on the signal acquired by pressure signal acquisition unit 33. Specifically, pressure signal determination unit 34 determines whether the hydraulic pressure acquired by pressure signal acquisition unit 33 is greater than a predetermined pressure. The predetermined pressure is stored in a storage 40.

For example, the predetermined pressure is set to be larger than the pilot pressure. The predetermined pressure may be changed by a temperature. For example, the predetermined pressure may be set to be less than relief pressure in the relief valve of coupler cylinder 21. However, when pressure sensor 41 is disposed near main pump 23, sometimes the predetermined pressure is higher than the relief pressure.

Pressure signal determination unit 34 outputs the signal indicating the determination result as to whether the hydraulic pressure acquired by pressure signal acquisition unit 33 is higher than the predetermined pressure to the valve controller 35.

Valve controller 35 drives and controls pressure increasing valve 25 based on the received signal of the determination result. When valve controller 35 receives the determination result that the pressure detected by pressure sensor 41 is higher than the predetermined pressure, valve controller 35 controls pressure increasing valve 25 such that the supply of the hydraulic oil to coupler cylinder 21 is stopped. Specifically, electromagnetic switching valve 24*b* receiving the instruction from valve controller 35 drives and controls the spool of main valve 24*a*, thereby stopping the supply of the hydraulic oil to coupler cylinder 21.

When valve controller 35 receives the determination result that the pressure detected by pressure sensor 41 is less than or equal to the predetermined pressure, valve controller 35 controls pressure increasing valve 25 to continue the supply of the hydraulic oil to coupler cylinder 21.

Controller 30 and storage 40 may be mounted on work machine 1 (FIG. 1) or may be disposed outside work machine 1. When being separately disposed outside work machine 1, controller 30 and storage 40 may be wirelessly connected to work machine 1 (pressure sensor 41, changeover switch 28, coupler switching valve 27, pressure increasing valve 25) or the like. For example, controller 30 is a processor, and may be a central processing unit (CPU).

Storage 40 may be connected to controller 30 in a wired (electric wiring or the like) manner or in a wireless manner. Storage 40 may be included in controller 30.

<Method for Controlling Hydraulic System 20>

Figure 6:
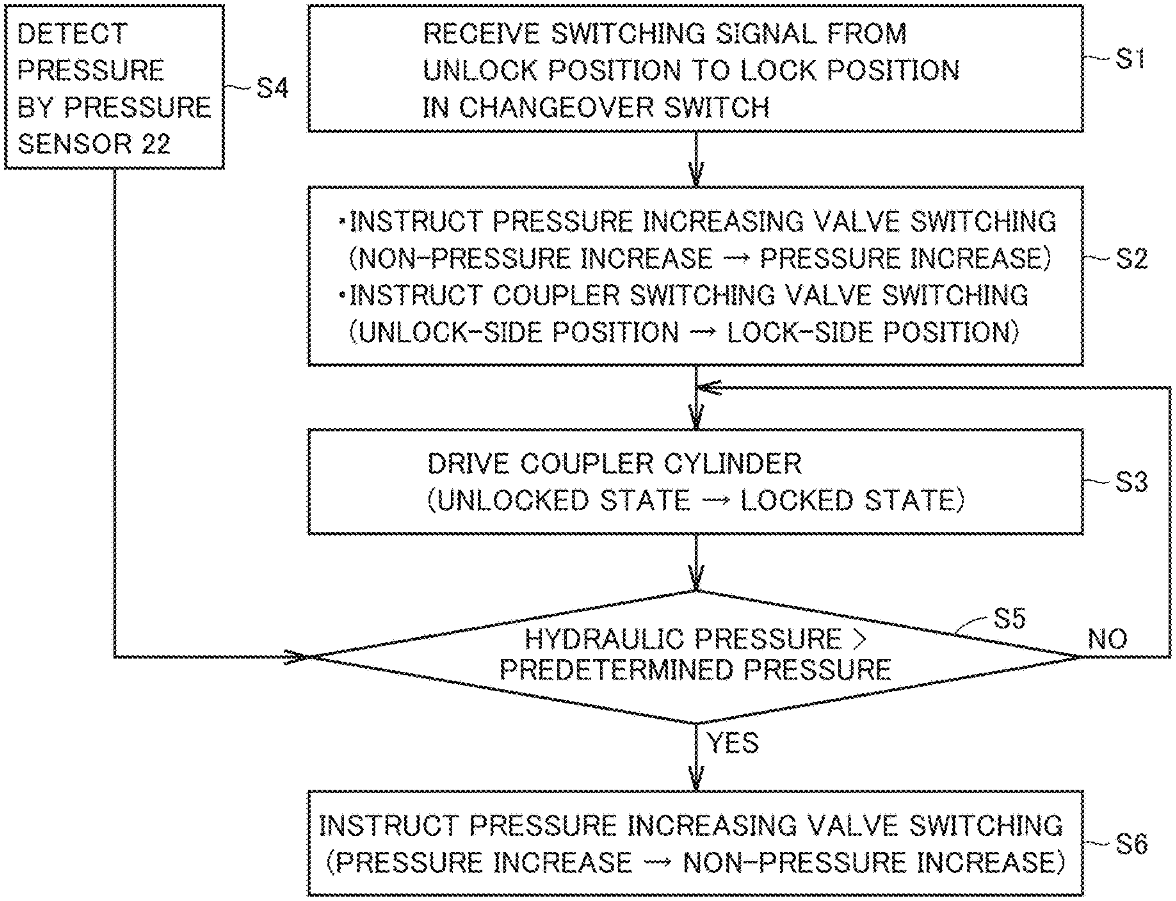
FIG. 6 is a flowchart illustrating an example of a method for controlling the hydraulic system used in the work machine of FIG. 1.
Figure 7:
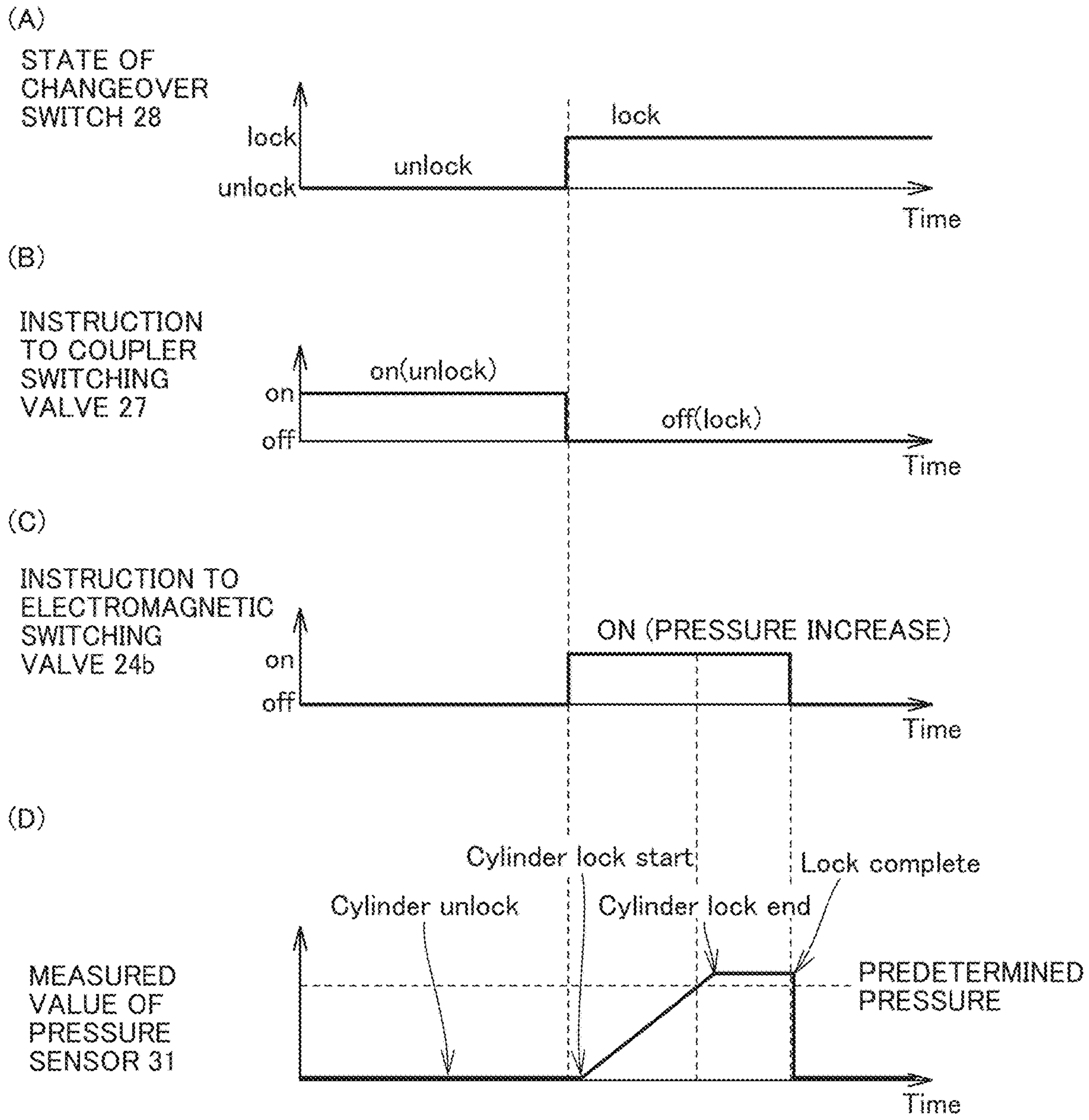
FIG. 7 is a view illustrating a control chart of a changeover switch (A), a coupler switching valve (B), an electromagnetic switching valve (C), and a pressure sensor (D) when the unlocked state is switched to the locked state.

With reference to FIGS. 6 and 7, a method for controlling the hydraulic system 20 of the embodiment in FIGS. 3 and 4 will be described below. Here, a control method in the case where bucket 6 is switched from the unlocked state (FIG. 4) to the locked state (FIG. 3) will be described as an example.

FIG. 6 is a flowchart illustrating an example of the method for controlling the hydraulic system used in the work machine of FIG. 1. FIG. 7 is a view illustrating a control chart of a changeover switch (A), a coupler switching electromagnetic switching valve (B), a pressure increasing electromagnetic switching valve (C), and a pressure sensor (D) when the unlocked state is switched to the locked state.

First, hydraulic system 20 is in the unlocked state illustrated in FIG. 4. In the unlocked state after the stop of the pressure increase, changeover switch 28 is at the unlock position as illustrated in FIG. 7(A). As illustrated in FIG. 7(B), coupler switching valve 27 is located at unlock-side position R2 (FIG. 4) when an on-signal is input. In addition, electromagnetic switching valve 24*b* does not supply the hydraulic oil from main pump 23 to coupler cylinder 21 when an off-signal is input as illustrated in FIG. 7(C). Thus, the pressure detected by pressure sensor 41 becomes zero as illustrated in FIG. 7(D).

The pilot oil is supplied from pump 29*a* to coupler cylinder 21. For this reason, head side 21H of coupler cylinder 21 becomes the pilot pressure. The unlocked state of coupler cylinder 21 is held (held) by the pilot pressure.

As illustrated in FIG. 7(A), changeover switch 28 is switched from the unlock position to the lock position. Thus, as illustrated in FIG. 5, the electric signal indicating the switching to the lock position in changeover switch 28 is input to switch signal determination unit 32 of controller 30 (step S1). Specifically, controller 30 receives a supply instruction of hydraulic oil to coupler cylinder 21 from changeover switch 28. Thereafter, switch signal determination unit 32 determines that changeover switch 28 is in the lock position, and outputs the position signal of the lock position to valve controller 35.

Valve controller 35 drives and controls coupler switching valve 27 and pressure increasing valve 25 based on the received position signal (step S2). Specifically, as illustrated in FIG. 7(B), valve controller 35 outputs the off-signal (a switching signal to lock-side position R1) to coupler switching valve 27. That is, valve controller 35 instructs coupler switching valve 27 to switch from unlock-side position R2 to lock-side position R1. Thus, coupler switching valve 27 is switched from unlock-side position R2 (FIG. 4) to lock-side position R1 (FIG. 3).

In addition, as illustrated in FIG. 7(C), valve controller 35 outputs the on-signal (a supply start signal of the hydraulic oil to coupler cylinder 21) to electromagnetic switching valve 24*b* of pressure increasing valve 25. That is, valve controller 35 instructs pressure increasing valve 25 to start the pressure increase of coupler cylinder 21. The spool of main valve 24*a* is driven by this instruction to start the supply of the hydraulic oil from main pump 23 to coupler cylinder 21 through pressure increasing valve 25. Thus, the bottom side of coupler cylinder 21 is changed from the non-pressure increasing state to the pressure increasing state, and piston 21*b* of coupler cylinder 21 is driven in lock direction P1 to start the transition from the unlocked state to the locked state (step S3).

Pressure sensor 41 detects the pressure in the oil passage from main pump 23 to coupler cylinder 21 (step S4). When the pressure increase of coupler cylinder 21 is started, the pressure detected by pressure sensor 41 gradually increases as illustrated in FIG. 7(D). Pressure signal determination unit 34 of controller 30 determines whether the increased pressure exceeds the predetermined pressure (step S5).

As a result of the above determination, when it is determined that the pressure detected by pressure sensor 41 does not exceed the predetermined pressure, the determination whether the pressure exceeds the predetermined pressure by pressure signal determination unit 34 is repeated.

On the other hand, as a result of the determination, when it is determined that the pressure detected by pressure sensor 41 exceeds the predetermined pressure, valve controller 35 drives and controls pressure increasing valve 25 based on the received signal of the determination result as illustrated in FIG. 5 (step S6).

Specifically, as illustrated in FIG. 7(C), valve controller 35 outputs the off-signal (a supply stop signal of the hydraulic oil to coupler cylinder 21) to electromagnetic switching valve 24*b* of pressure increasing valve 25. That is, valve controller 35 instructs pressure increasing valve 25 to stop the pressure increase of coupler cylinder 21 and to become the non-pressure increase. The spool of main valve 24*a* is driven by this instruction, and the supply of the hydraulic oil from main pump 23 to coupler cylinder 21 is stopped by main valve 24*a*. Thus, as illustrated in FIG. 7(D), the pressure detected by pressure sensor 41 becomes zero.

In the non-pressure increasing state, the pilot oil is supplied from pump 29*a* to coupler cylinder 21. For this reason, bottom side 21B of coupler cylinder 21 becomes the pilot pressure. The locked state of coupler cylinder 21 is held (held) by the pilot pressure.

In step S6, as illustrated in FIGS. 7(C) and 7(D), the off-signal is output to electromagnetic switching valve 24*b* after a predetermined time elapses from when it is determined that the pressure detected by pressure sensor 41 exceeds the predetermined pressure. Further, when the off-signal is output to electromagnetic switching valve 24*b* after a sufficient time elapses after the pressure detected by pressure sensor 41 exceeds the predetermined pressure, coupler cylinder 21 can be reliably caused to reach the stroke end.

Although the case where coupler cylinder 21 transfers from the unlocked state to the locked state has been described above, hydraulic system 20 is similarly controlled even when coupler cylinder 21 transfers from the locked state to the unlocked state.

<Advantageous Effect>

An advantageous effect of the embodiment will be described below.

According to the embodiment, as illustrated in FIG. 3, controller 30 instructs pressure increasing valve 25 to stop the supply of the oil (for example, hydraulic oil) to coupler cylinder 21 based on the pressure in the oil passage between main pump 23 and coupler cylinder 21. Thus, that coupler cylinder 21 reaches the stroke end from the pressure of the pressure sensor can be detected to stop the pressure increase of the oil (for example, hydraulic oil). Consequently, fuel can be prevented from being continuously consumed wastefully, and fuel efficiency is improved.

In addition, controller 30 instructs pressure increasing valve 25 to stop the supply of the oil (for example, hydraulic oil) to coupler cylinder 21 based on the pressure in the oil passage between main pump 23 and coupler cylinder 21. Thus, the locked state of coupler cylinder 21 can be reliably detected. Consequently, a lock failure due to an abnormality of main pump 23, an operation failure of valves 25, 27, or the like can be prevented.

As described above, the hydraulic system for the work machine, the work machine, and the method of controlling the hydraulic system, which have good fuel efficiency and can prevent erroneous recognition of the locked state, can be implemented according to the embodiment.

In the embodiment, as illustrated in FIGS. 3 and 4, controller 30 instructs pressure increasing valve 25 to start the supply of the oil (for example, hydraulic oil) to coupler cylinder 21 based on the supply instruction of the oil (for example, hydraulic oil) to coupler cylinder 21.

This allows controller 30 to control the supply of oil.

In the embodiment, as illustrated in FIGS. 3 and 4, the oil supply instruction is based on the operation of the alternate switch.

Thus, when once being switched to the lock position or the unlock position, changeover switch 28 maintains the state even when the operator releases the hand from changeover switch 28.

In the embodiment, as illustrated in FIGS. 7(C) and 7(D), controller 30 stops the supply of the oil (for example, hydraulic oil) to coupler cylinder 21 at a time point when the pressure detected by pressure sensor 41 reaches a predetermined pressure. The predetermined pressure is set to be larger than the pilot pressure.

Sometimes the pilot pressure is used to hold the locked state or the unlocked state of coupler cylinder 21. In this case, when the predetermined pressure is set to be larger than the pilot pressure, the non-pressure increasing state holding the locked state or the unlocked state can be clearly distinguished from the pressure increasing state.

In the embodiment, as illustrated in FIGS. 3 and 4, hydraulic system 20 includes coupler switching valve 27 that switches between the locked state and the unlocked state of coupler cylinder 21. Thus, coupler cylinder 21 can be switched between the locked state and the unlocked state.

In the embodiment, as illustrated in FIGS. 3 and 4, hydraulic system 20 includes pressure sensor 41 that detects the pressure in the oil passage between main pump 23 and coupler cylinder 21.

The locked state of coupler cylinder 21 can be reliably detected by detecting the pressure by pressure sensor 41. Consequently, a lock failure due to the abnormality of main pump 23, an operation failure of valves 25, 27, or the like can be prevented.

Figure 8:
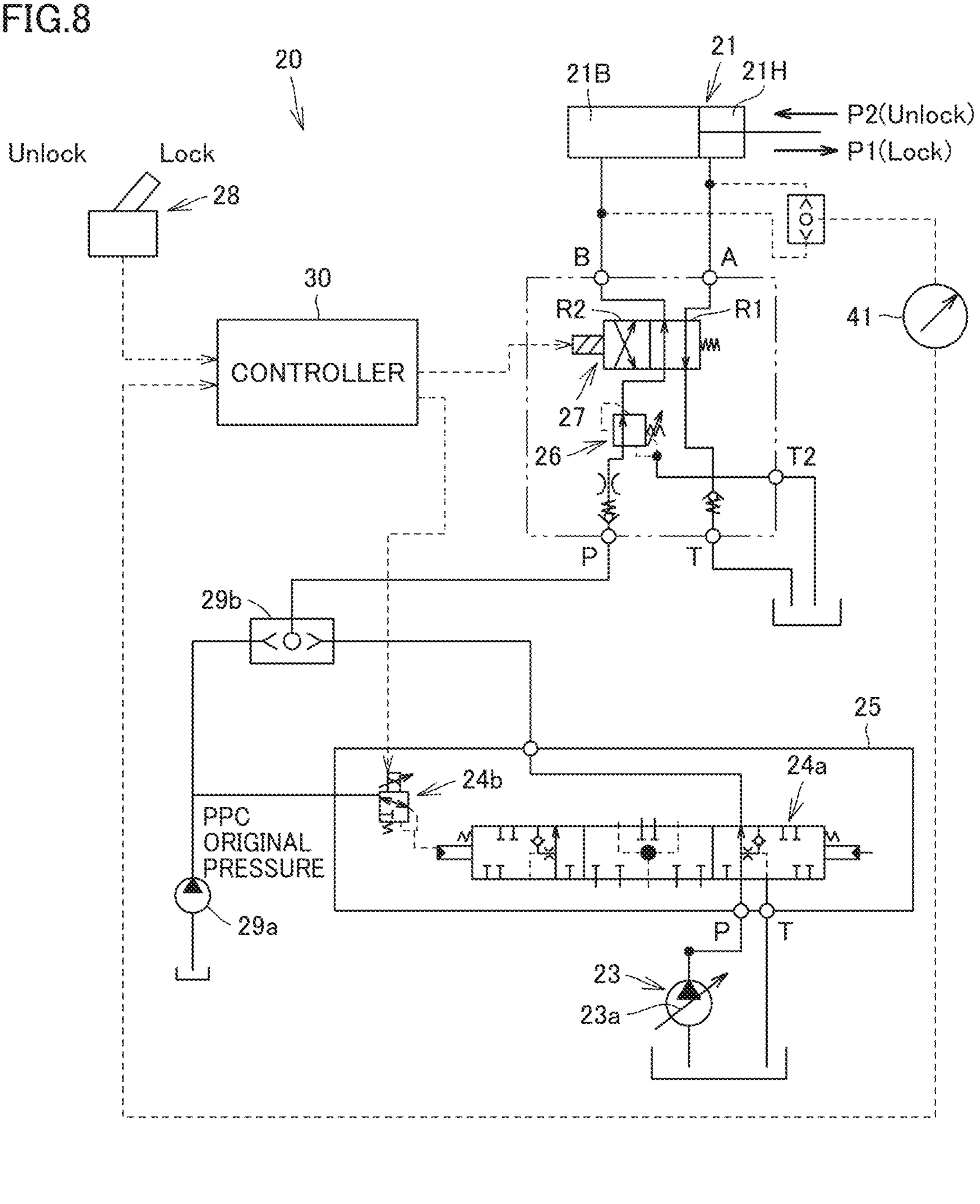
FIG. 8 is a view illustrating the locked state of the coupler cylinder in a modification of the hydraulic system.

In the embodiment, as illustrated in FIGS. 3 and 4, the configuration in which pressure sensor 41 is provided so as to be able to detect the pressure between main pump 23 and pressure increasing valve 25 has been described. However, as long as pressure sensor 41 is provided in the oil passage between main pump 23 and coupler cylinder 21, for example, the pressure sensor 41 may be disposed so as to be able to detect the hydraulic pressure (pressure) between coupler switching valve 27 and coupler cylinder 21 as illustrated in FIG. 8.

Pressure sensor 41 may be disposed so as to be able to measure the pressure in main pump 23, and measure the pressure in coupler cylinder 21.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

REFERENCE SIGNS LIST

1: work machine (wheel loader), 2: body frame, 3: work implement, 4: traveling device, 4*a*: front traveling wheel, 4*b*: rear traveling wheel, 5: cab, 6: bucket, 6*a*: bracket, 6*b*, 7*b*: through-hole, 6*c*: hook, 7: quick coupler, 7*a*: frame, 7*c*: connecting pin, 11: front frame, 12: rear frame, 13: steering cylinder, 14: boom, 16: bell crank, 17: tilt rod, 18: boom cylinder, 19: bucket cylinder, 20: hydraulic system, 21: coupler cylinder, 21B: bottom side, 21H: head side, 21*a*: cylinder tube, 21*b*: piston, 21*c*: piston rod, 22: fixing pin, 23: main pump, 23*a*: swash plate, 24*a*: main valve, 24*b*: electromagnetic switching valve, 25: pressure increasing valve, 26: pressure reducing valve, 27: coupler switching valve, 28: changeover switch, 29*a*: pump, 29*b*: shuttle valve, 30: controller, 31: switch signal acquisition unit, 32: switch signal determination unit, 33: pressure signal acquisition unit, 34: pressure signal determination unit, 35: valve controller, 40: storage, 41: pressure sensor

The invention claimed is:

1. A hydraulic system for a work machine comprising:
   - a coupler cylinder that is driven between an extended position and a retracted position by being supplied with oil;
   - a hydraulic pump that supplies the oil to the coupler cylinder in order to drive the coupler cylinder between the extended position and the retracted position;
   - a valve that controls the supply of the oil to the coupler cylinder; and
   - a controller that controls drive of the valve,
   - wherein the controller instructs the valve to stop the supply of the oil to the coupler cylinder based on pressure in an oil passage between the hydraulic pump and the valve, and
   - wherein oil having a pressure greater than or equal to a predetermined value is supplied to the coupler cylinder while the coupler cylinder is fixed at each of the extended position and the retracted position.

2. The hydraulic system for a work machine according to claim 1, wherein the controller instructs the valve to start the supply of the oil to the coupler cylinder based on an oil supply instruction to the coupler cylinder.

3. The hydraulic system for a work machine according to claim 2, wherein the oil supply instruction is based on an operation of an alternate switch.

4. The hydraulic system for a work machine according to claim 1, wherein the controller stops the supply of the oil to the coupler cylinder at a time point when the pressure in the oil passage between the hydraulic pump and the coupler cylinder reaches a predetermined pressure, and the predetermined pressure is set to be larger than a pilot pressure.

5. The hydraulic system for a work machine according to claim 1, further comprising a switching valve that switches between the extended position and the retracted position of the coupler cylinder.

6. The hydraulic system for a work machine according to claim 1, further comprising a pressure sensor that detects the pressure in the oil passage between the hydraulic pump and the coupler cylinder.

7. A work machine comprising:

a machine body;

an attachment that is capable of switching between a locked state and an unlocked state with respect to the machine body;

a coupler cylinder that is driven between the locked state and the unlocked state of the attachment by being supplied with oil;

a hydraulic pump that supplies the oil to the coupler cylinder;

a valve that controls the supply of the oil to the coupler cylinder; and a controller that controls drive of the valve, wherein the controller instructs the valve to stop the supply of the oil to the coupler cylinder based on pressure in an oil passage between the hydraulic pump and the valve, and wherein oil having a pressure greater than or equal to a predetermined value is supplied to the coupler cylinder while the coupler cylinder is fixed at each of the locked state and the unlocked state.

8. A method for controlling a hydraulic system in a work machine including a coupler cylinder that is driven between an extended position and a retracted position by being supplied with oil, a hydraulic pump that supplies the oil to the coupler cylinder in order to drive the coupler cylinder between the extended position and the retracted position, and a valve that controls the supply of the oil to the coupler cylinder, the method comprising:

detecting pressure in an oil passage between the hydraulic pump and the valve; and outputting a supply stop signal of the oil to the coupler cylinder to the valve based on the detected pressure, wherein oil having a pressure greater than or equal to a predetermined value is supplied to the coupler cylinder while the coupler cylinder is fixed at each of the extended position and the retracted position.

* * * * *